United States Patent [19]

Halttunen et al.

[11] Patent Number: 5,603,103
[45] Date of Patent: Feb. 11, 1997

[54] RADIO TELEPHONE WITH COMPLIANT SHIELD AND METHOD

[75] Inventors: Mikko Halttunen, Oulu; Pertti Korhonen, Salo, both of Finland

[73] Assignee: Nokia Mobile Phones Ltd., Salo, Finland

[21] Appl. No.: 343,083

[22] Filed: Nov. 21, 1994

[30] Foreign Application Priority Data

Nov. 26, 1993 [FI] Finland ................. 935269

[51] Int. Cl.⁶ ................................. H04B 1/38
[52] U.S. Cl. .................... 455/90; 455/89; 455/300; 455/351; 174/35 R; 29/593; 29/829; 324/763; 361/316
[58] Field of Search ................ 455/89, 90, 128, 455/349, 300, 301, 344, 351, 347; 361/753, 800, 799, 816, 818, 212, 220, 253, 814, 777; 174/35 R, 35 TS, 35 GC, 51; 439/108, 105, 607; 29/593, 829, 846, 558; 324/763, 716; 371/22.5, 22.6

[56] References Cited

U.S. PATENT DOCUMENTS

| | | | |
|---|---|---|---|
| 4,890,199 | 12/1989 | Beutler | 455/300 |
| 5,045,973 | 9/1991 | Saarela et al. | 174/35 R |
| 5,095,177 | 3/1992 | Johnson | 174/35 R |
| 5,107,404 | 4/1992 | Tam | 361/424 |
| 5,150,282 | 9/1992 | Tomura et al. | 361/424 |
| 5,151,946 | 9/1992 | Martensson | 379/59 |
| 5,190,325 | 3/1993 | Doss-Desaiza | 292/251.5 |
| 5,206,796 | 4/1993 | Thompson et al. | 174/35 R |
| 5,301,224 | 4/1994 | Major | 379/58 |
| 5,353,201 | 10/1994 | Maeda | 361/816 |
| 5,361,459 | 11/1994 | Hyvonen et al. | 24/35 |
| 5,365,410 | 11/1994 | Lonka | 361/816 |
| 5,392,461 | 2/1995 | Yokoyama | 455/90 |
| 5,400,949 | 3/1995 | Hirvonen et al. | 228/180.22 |
| 5,414,597 | 5/1995 | Lindland et al. | 361/816 |
| 5,420,759 | 5/1995 | Charlier et al. | 455/351 |
| 5,446,395 | 8/1995 | Goto | 324/763 |

OTHER PUBLICATIONS

Finnish Office Action and English Translation thereof dated 30 Jun. 1994, Application No. 935269, Nokia Mobile Phones Ltd.

Primary Examiner—Reinhard J. Eisenzopf
Assistant Examiner—Doris To

[57] ABSTRACT

An assembly and method of assembly for shielding a radio telephone. First and second shields are disposed either side of a circuit board and urged together thereby sandwiching the circuit board. The first shield is relatively rigid compared to the second shield and can cause any deformities in the second shield to be compensated for by the second shield being urged against a rigid first shield, the shields may be removably coupled together which permits simple and quick disassembly if changes or repairs need to be made to the radio telephone.

15 Claims, 4 Drawing Sheets

RADIO TELEPHONE WITH COMPLIANT SHIELD AND METHOD

FIELD OF THE INVENTION

This invention relates to a housing for a radio telephone, in particular a housing which inhibits electromagnetic radiation and which may be used in a wide number of portable radio telephones.

BACKGROUND OF THE INVENTION

Radio telephones are required by law to adhere to Electromagnetic Compatibility (EMC) limits as laid down in Type Approval specifications for Mobile Phones. EMC is defined as the ability of a device to function properly in its intended electromagnetic environment and to not be a source of electromagnetic pollution to that environment.

To enable electronic apparatus to be electromagnetically compatible, electromagnetic (EM) shielding is often placed within the apparatus to reduce the radiation emissions from radiating sources and to reduce the levels of radiation reaching sensitive components.

In known radio telephone designs interfering electronic circuits are segregated onto a number of circuit boards. The circuit boards are located in spaces within the frame structure of the telephone which are separated by high partitions to inhibit unwanted EM radiation passing between the circuits. The frame structure tends to be relatively large and generally forms part of the outer surface of the telephone.

In other known radio telephone designs the EM shielding of the electronic circuits is implemented using either metal casings or metallized plastic casings fixed onto a circuit board by soldering. A drawback of this design is that the inspection and repair of soldered electronic components is blocked by the presence of the EM shield casings. To overcome this drawback the EM shield casing is de-soldered, Inspection and repair performed on the soldered electronic components, then the casing is re-soldered onto the circuit board.

In the patent publication FI-85204 a frame structure of a radio phone is disclosed in which the frame comprises a substantially conducting frame plate, whereby the frame plate together with the ground foil of the circuit board forms the EMC shielding for the components located on the side of the circuit board facing the frame plate.

In the Finnish patent application FI-915242 a method is disclosed for producing a sealing compound to secure a EM shield case on to a circuit board thus preventing radio frequency (RF) radiation or conducting electricity on the case from disturbing other components in the telephone. The patent application also discloses a method for installing a circuit board to be RF shielded for example on the frame of a radio telephone.

In prior art designs, one of the problems has been the interference radiation emitted by the radio telephone and the EM shielding arranged for the prevention and attenuation of said radiation. The prior art designs are either too inefficient or too complex end difficult to implement. The prior art designs also include a number of circuit boards, which makes the entire assembly and the design of the EMC shielding more difficult.

BRIEF SUMMARY OF THE INVENTION

According to a first aspect of the present invention there is provided an assembly for a radio telephone comprising, a substantially planar support member, and first and second shielding members for respectively shielding first and second major surfaces of the support member, the support member being disposed between the first and second shielding members, characterized in that the first shielding member is rigid relative to the second shielding member and is coupled to the second shielding member such that the first and second shielding members are urged against respective first and second major surfaces of the support member, An assembly in accordance with the invention has the advantage that it forms a rigid module that can withstand temperature fluctuations and physical punishment. The assembly also resolves the problem of shielding with a neat and easy to design solution. Additionally, any deformities in the second shielding member can be substantially overcome by urging it against the relatively rigid first shielding member, through the support member. This permits the second shielding member to be made of relatively lightweight material.

In a preferred embodiment the assembly is so designed as to allow quick and simple replacement and repair of components located beneath the shielding, This is achieved by making the two shielding members removably coupled together thus allowing simple de-coupling to enable access to faulty components.

Suitably the shielding members of the assembly have internal walls. These shield the separate circuits contained on the circuit board from one another. For example RF circuitry may need to be shielded from audio circuitry within a radio telephone.

The assembly is preferably designed for EM shielding by making the shielding members conductive, However, the design also permits shielding of components from, for example, dust or liquids, A suitable electrical conductor is metal which also permits heat conduction thus allowing the shielding members to act as heat sinks for the circuit board components. Optionally, grounded conductive tracks may be provided on the circuit board for electrical coupling to the shields thereby improving the EM shielding, In a preferred embodiment the coupling of the shielding members is achieved by snap type fittings. This makes the process of coupling and de-coupling the shielding members simple, The snap type fittings comprising holes into which snap type barbs can fit can replace screw fittings, and the edges of the shielding members may be coupled using snap type fittings located on the edges of the shielding members.

The support member may be made relatively compliant with respect to the shielding members. This permits the shielding members to deform the surface of the support member where they touch it, thereby providing good contact with the surface. For a support member which is a circuit board having conductive ground tracks, disposed such that they contact the shielding members, a compliant circuit board ensures a good electrical contact and hence RF seal. Additionally, if there are any deformities in the second shielding member these can be accommodated by the compliance of the support member.

The use of a rigid shielding member provides a platform onto which the other shielding member is coupled. The advantage of this design is that the non-rigid shield can be made of a material which is compliant which introduces the possibility of using inexpensive, light materials thus reducing the cost and weight of the final product. The compliance of the non-rigid shielding member has an added advantage of conforming to the contours of the support member upon being urged thereto. This ensures that the shielding member remains in contact with the grounding planes of the support member at every point required.

According to a second aspect of the present invention there is provided a method of assembling a housing for a radio telephone, comprising;

disposing a first shielding member to a first major surface of a substantially planar support member;

disposing a second shielding member to a second major surface of the substantially planar support member;

coupling the first and second shielding members together thereby sandwiching the support member between them; and urging the first and second shielding members against respective first and second major surfaces of the support member.

A method in accordance with the invention has the advantage that it is simple to perform, produces a consistently reliable product, requires relatively cheap materials and is ideally suited to mass production techniques. Relatively lightweight, easily moldable material may be used for the second shielding.

In a preferred embodiment the method comprises milling the substantially planar support member prior to fixing the shielding members thereto. In cutting the support member damage may result in components which are attached thereto. The advantage of this method is that the cutting of the support member is carried out substantially by the milling process preferably before any components are attached leaving just a simple trimming process to be carried out at the final stage of assembly.

Suitably the support member is provided with conductive tracks which permits the testing of components in situ, i.e. the components may still be tested with the shielding members in place. The advantage of this is that during testing the components will perform in exactly the way they would had they been in a fully assembled radio telephone.

By providing removable shielding members the method of assembly has certain advantages. For example, if components are tested in situ and are found to be faulty the shielding members may be removed to allow access to the faulty component for repair or replacement thereof.

DETAILED DESCRIPTION OF AN EMBODIMENT OF THE INVENTION

Figure 1:
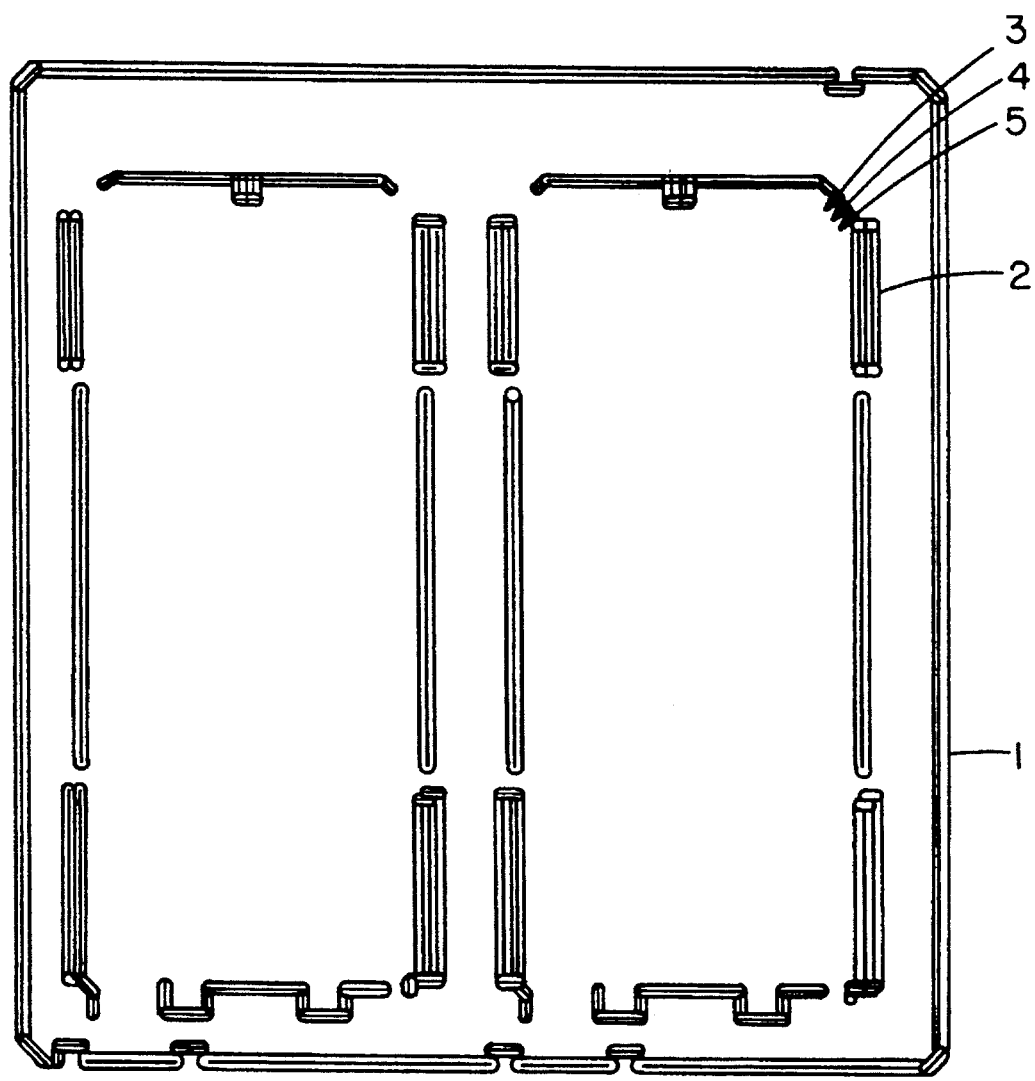
FIG. 1 presents a circuit board blank of a structure design of a radio telephone according to the invention.

FIG. 1 presents a circuit board blank of a structure design of a radio telephone in accordance with the present Invention. In the circuit board blank 1 millings have been made for cutting the circuit board end for the mounting of shields. The remaining shoulders act as supports for the circuit board whilst positioning the components and as paths of the test signal wires 3–5 whilst testing during production. A circuit board blank 1 comprises a shoulder 2, milled off after the testing. The testing of a module is accomplished utilizing the projecting test signal draws 3–5 and the module are cut off after the testing.

Figure 2:
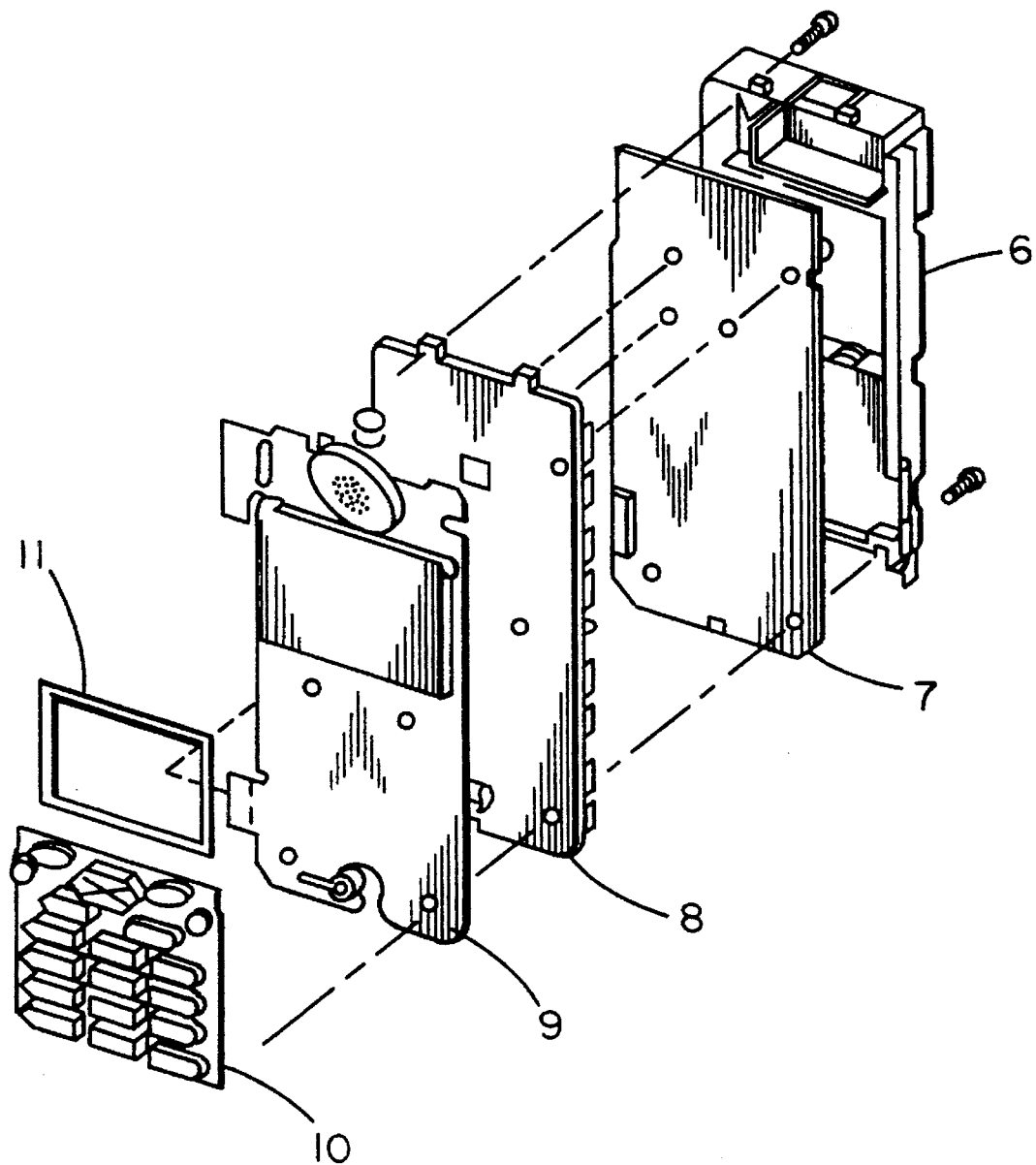
FIG. 2 presents a structure design of a radio telephone according to the invention.

FIG. 2 presents a structure design of a radio telephone in accordance with the invention. The design in the standard composition comprises a metal frame 6, a circuit board 7, and a metallized plastic shield 8. The circuit board 7 may also be a two-layer circuit board or a multiple-layer circuit board. When a User Interface (UIF) module 9 dependent on the product design a keyboard 10, a protection 11 for the display, and the outer casing are mounted on the circuit board 7 with the shield 6,8, while being assembled, an individual radio telephone is obtained.

Figure 3:
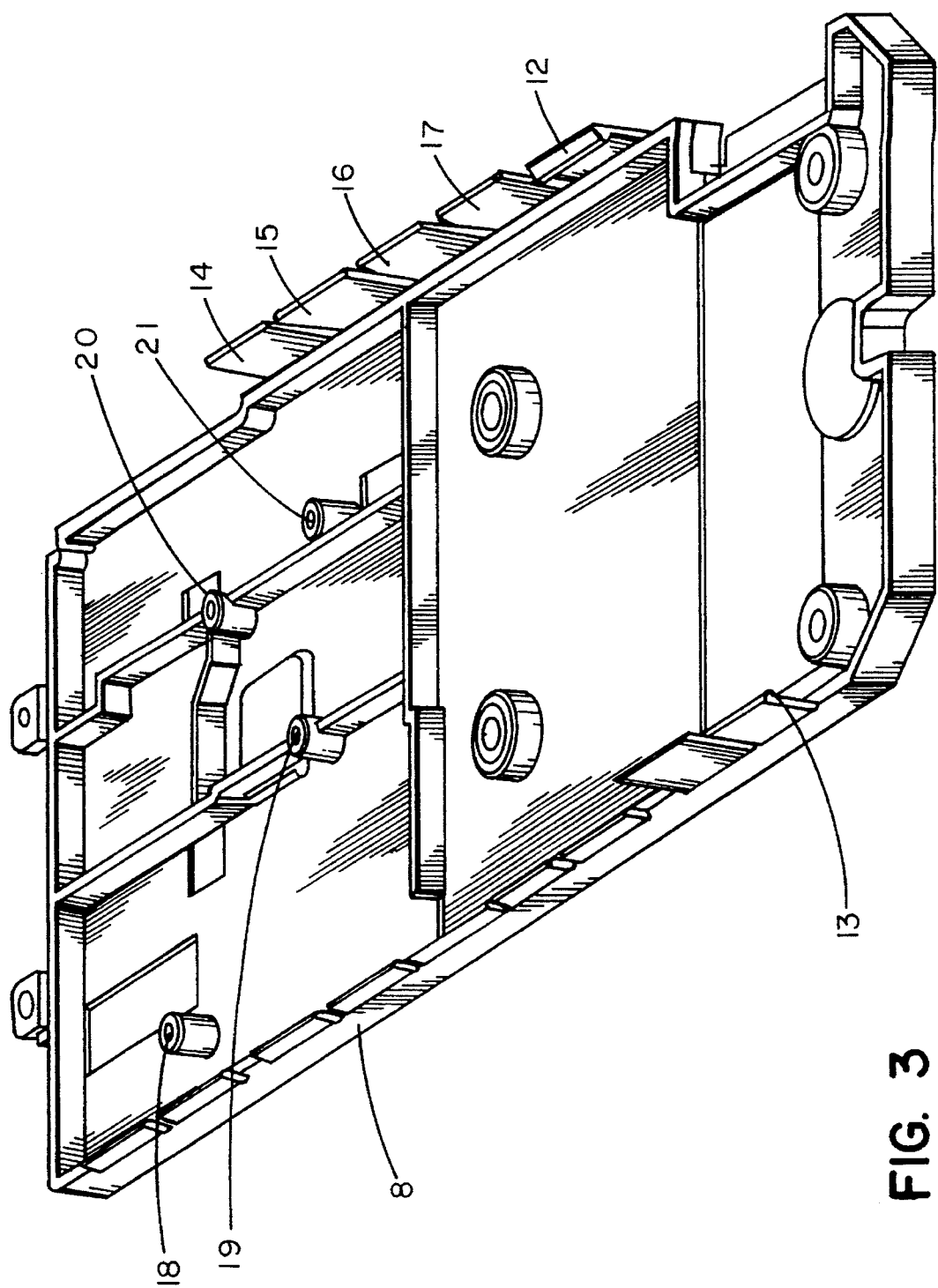
FIG. 3 presents the metallized plastic shield of the structure design of a radio telephone according to the invention.

FIG. 3 presents a metallized plastic shield of the structure design of a radio telephone In accordance with the invention. The metallized plastic shield 8 comprises snap connections elements 12, 13, with the aid of which the metallized plastic shield 8 is locked on the metal frame 6. The metallized plastic shield 8 also comprises guiding elements 14–17 with the aid of which the shield 8 is guided in place, The guiding elements 14–17 also serve as contact elements between the shields 6,8. The metallized plastic shield 8 also comprises screw boss 18–21 for guiding the circuit board 7 in place.

Figure 4:
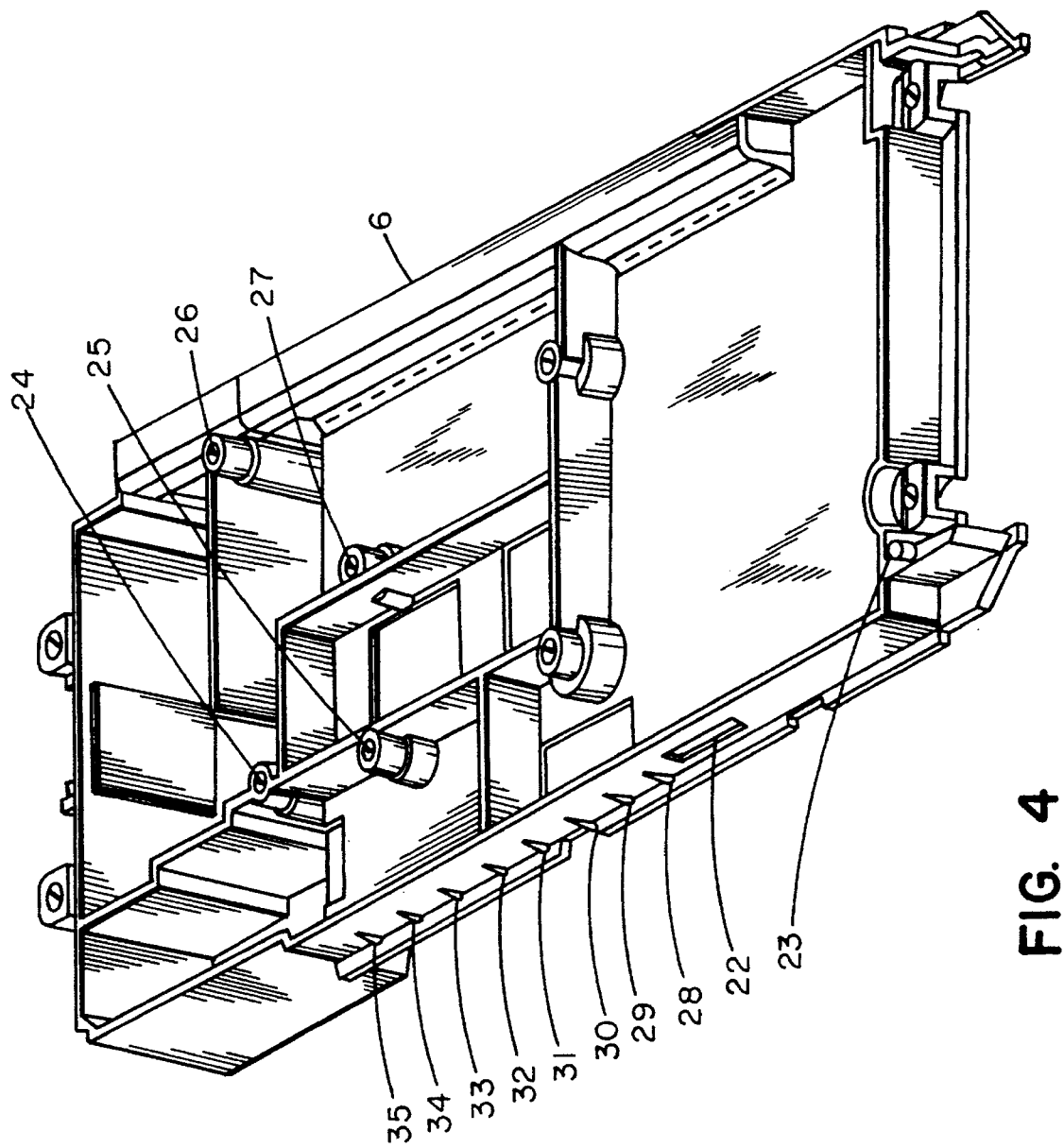
FIG. 4 presents the metal shield of the structure design of the radio telephone according to the invention.

FIG. 4 shows a metal frame of the structure design of a radio telephone in accordance with the invention. Said metal frame 6 serving as a shield comprises recesses for snap connections 22, wherewith the metal frame 6 is locked with the metallized plastic shield 8. The metal frame 6 includes a guide pin 23 of which there may be several, and screw basses 24–27 which may also be of service when guiding the circuit board 7 in place, The metal frame 6 comprises also contact elements 28–35 between the shields 6,8.

In a design of radio telephone in accordance with the invention, the shields 6,8 are placed on both sides of the circuit board 7, and they are locked to each other by snap connections 12,13,22 and with screws, The shields 6,8 are guided with the aid of separate guiding elements 14–17, 23, and possibly with screw bosses 18–21, 24–27 to be precisely in place.

The shields 6,8 have been caved inside depending on the shielding needs. The circuit board has ground plane tracks disposed on it for electrically coupling to the shields. By using the metal frame 6 together with the metallized plastic shield 8, sufficient compression is provided between the circuit board 7 and the shields 6,8 since the plastic is elastic, for conforming the plastic shield to the plane of the circuit board surface. Additionally, the metal has an uneven surface and thus grips the ground plane tracks thereby providing good electrical coupling.

With the aid the metal frame 6 and the metallized plastic shield 8, good sufficient rigidity is provided in the radio telephone. The shields 6,8 have been so designed that they act as the body of the phone. In addition, the metallic frame part 6 also acts as a cooling element for the circuit board. The external shielding has been implemented by making use of the contact points between the components end the Internal protection by the aid of the ground surface at the wall.

In a design according to the invention, the multiple layer circuit board 7 or the two-layer circuit board 7 is protected on both sides with a metal frame 6 and with a metallized plastic shield 8 both against the outward and inward radiation.

The design according to the invention is both simple and productive. The assembly is easy to automate because the parts are rigid and they are guided in place at the guide surfaces.

In view of the foregoing description it will be evident to a person skilled in the art that various modifications may be made within the scope of the invention.

The scope of the present disclosure includes any novel feature or combination of features disclosed therein either explicitly or implicitly or any generalization thereof irrespective of whether or not it relates to the claimed invention or mitigates any or all of the problems addressed by the present invention. The applicant hereby gives notice that new claims may be formulated to such features during prosecution of this application or of any such further application derived therefrom.

What we claim is:

1. An assembly for a radio telephone comprising, a substantially planar support member, and first and second shielding members for respectively shielding first and second major surfaces of the support member, the support member being disposed between the first and second shielding members, characterized in that the first shielding member is rigid relative to the second shielding member and is coupled to the second shielding member and said second shielding member is complaint such that the first and second shielding members are urged against respective first and second major surfaces of the support member and through the compliance of the second shielding member the second shielding member conforms to the contours of the support member upon being urged thereto, and wherein at least one of the first and second shielding members is provided with a rib of engaging with a receiving member on the other shielding member to ensure electrical contact between the first and second shielding members.

2. An assembly as claimed in claim 1, wherein the first and second shielding members are removably coupled together.

3. An assembly as claimed in claim 1, wherein at least one of the first and second shielding members includes a wall depending therefrom towards the support member.

4. An assembly as claimed in claim 1, wherein the shielding members are electrically conductive to inhibit the passage of electromagnetic radiation.

5. An assembly as claimed in claim 1, wherein at least one of the first and second shielding members has guiding means for aligning the shielding members with the planar support member.

6. An assembly as claimed in claim 1, wherein the first and second shielding members are coupled together by snap type fittings.

7. An assembly as claimed in claim 1, wherein the first and second shielding members are coupled together by screw fittings.

8. An assembly as claimed in claim 1, wherein the substantially planar support member is a circuit board for supporting electrical components.

9. An assembly as claimed in claim 8, wherein at least one major surface of the circuit board includes a conductive grounded track.

10. An assembly as claimed in claim 8, wherein the circuit board has at least one electrical contact element for electrically coupling one or more components on the circuit board and extending to a minor surface of the circuit board.

11. A method of assembling a housing for a radio telephone, comprising:

disposing a first shielding member to a first major surface of a substantially planar support member;

disposing a second compliant shielding member to a second major surface of the substantially planar support member;

coupling the first and second shielding members together thereby sandwiching the support member between said first and second shielding members; and urging the first and second shielding members against respective first and second major surfaces of the support member so as to cause said second shielding member to conform to said second major surface, and wherein the support member has an electrically conductive track for electrically coupling a component supported by the circuit board and shielded by the shielding members with test apparatus disposed outside the shielding to allow testing at any stage in the assembling process.

12. A method as claimed in claim 11, wherein the testing is performed after coupling the first and second shielding members together and should the testing reveal any faulty component the first and second shielding members may be de-coupled to permit access to said component for repair or replacement thereof.

13. A method of assembling a housing for a radio telephone, comprising:

disposing a first shielding member to a first major surface of a substantially planar support member;

disposing a second compliant shielding member to a second major surface of the substantially planar support member;

coupling the first and second shielding members together thereby sandwiching the support member between said first and second shielding members;

urging the first and second shielding members against respective first and second major surfaces of the support member so as to cause said second shielding member to conform to said second major surface; and wherein prior to coupling the first and second shielding members together the support member is milled to allow the shielding members to interconnect then subsequent to coupling the first and second shielding members together the support member is further trimmed to leave a completely shielded support member.

14. A method of assembling a housing for a radio telephone, comprising:

disposing a first shielding member to a first major surface of a substantially planar support member;

disposing a second shielding member to a second major surface of the substantially planar support member;

coupling the first and second shielding members together thereby sandwiching the support member between said first and second shielding member;

urging the first and second shielding members against respective first and second major surfaces of the support member; and prior to coupling the first and second shielding members together the support member is substantially milled to prevent damage to other components to be attached thereto and to allow the shielding members to be coupled together and then subsequent to coupling the first and second shielding members together the support member is further trimmed to leave a completely shielded support member.

15. A method of assembling a housing for a radio telephone, comprising:

disposing a first shielding member to a first major surface of a substantially planar support member;

disposing a second shielding member to a second major surface of the substantially planar support member;

coupling the first and second shielding members together thereby sandwiching the support member between said first and second shielding member;

urging the first and second shielding members against respective first and second major surfaces of the support members; and providing the support member with an electrically conductive track for electrically coupling a component supported by the circuit board and shielded by the shielding members with test apparatus disposed outside the shielding to allow testing at any stage in the assembling process, including testing performed after coupling the first and second shielding members together and should the testing reveal any faulty component, the first and second shielding members may be de-coupled to permit access to said component for repair or replacement thereof, said support member including a shoulder which is cut off after testing.

* * * * *